Nov. 7, 1933.     C. G. LLOYD     1,933,560
ELECTRIC SHEET WELDING APPARATUS
Filed Feb. 7, 1929
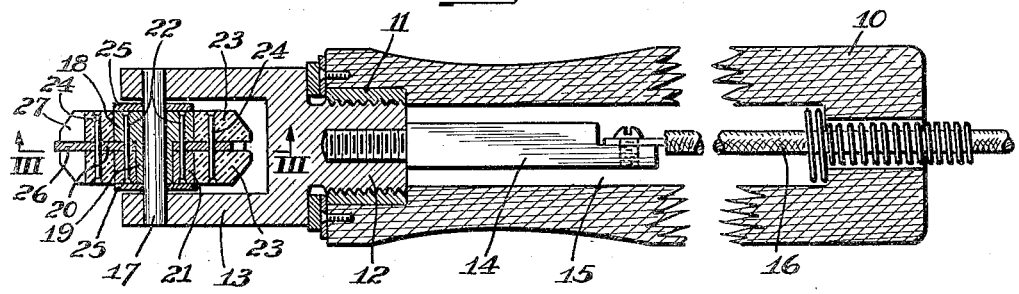
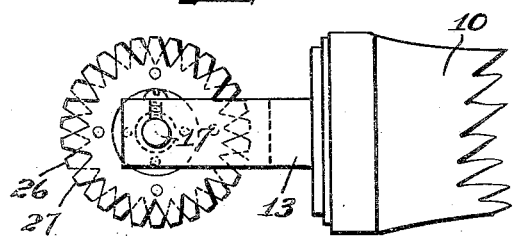
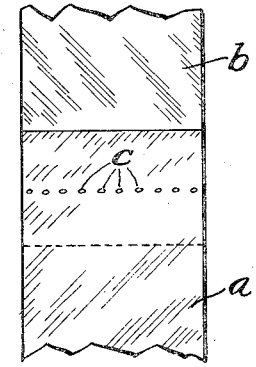
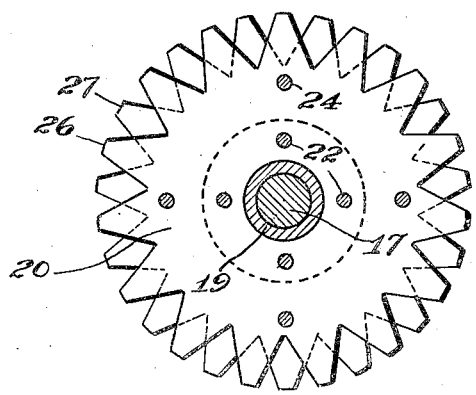
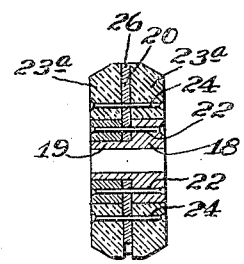
WITNESS
INVENTOR
Charles G. Lloyd
By Brown & Critchlow
his Attorneys.

Patented Nov. 7, 1933

1,933,560

UNITED STATES PATENT OFFICE 1,933,560

ELECTRIC SHEET-WELDING APPARATUS

Charles G. Lloyd, New Kensington, Pa., assignor to Aluminum Company of America, Pittsburgh, Pa., a corporation of Pennsylvania Application February 7, 1929. Serial No. 338,208

5 Claims. (Cl. 219—8)

My invention pertains to devices for welding together metallic sheets, especially thin sheets, such as the foils of aluminum and kindred metals.

The principal object of the invention is to provide a device by which metallic sheets,—especially thin sheets, such, for instance, as the metallic foils,—can be welded together easily and rapidly. One field of usefulness is in the manufacture of foil, for example, aluminum foil, where it frequently occurs that the web of foil becomes torn between the "on" roll and the "off" roll during rewinding. To reunite the torn ends of the web of foil satisfactorily and quickly has heretofore presented a material problem, which is solved by my invention.

In practicing my invention, I superimpose one metallic sheet upon another. A closed electric circuit is made between the sheets and a suitable electrode, and an electric arc is drawn between the top sheet and a second electrode as the latter is moved away from physical contact with the sheet. The heat of the arc melts the sheets, and thus the sheets are fused together at the point where the arc has been drawn. I have produced a device by means of which such arcs can be drawn successively at a number of points spaced from one another, whereby the sheets are united by a series of welds in the nature of spot welds.

I have described, by way of example, in the following specification, and shown in the accompanying drawing, a device constructed in accordance with my invention, but it is to be understood that the invention may be embodied in other forms without exceeding the scope thereof as defined in the appended claims.

In the drawing:

Fig. 1 is a side elevation of the front end of a welding device embodying my invention;

Fig. 2 is a sectional plan of the device;

Fig. 3 is an enlarged sectional view of the electrode wheel, the section being taken on the line 3—3, of Fig. 2, looking in the direction of the arrows;

Fig. 4 is a view illustrating the nature of the union produced by the use of the device; and Fig. 5 shows in cross section a modified form of electrode wheel.

Referring now to the drawing, the device comprises an insulating handle 10 into the front end of which is driven an internally threaded bushing 11 for receiving the threaded shank 12 of a metallic clevis 13. A post 14, to which an electric conductor 16 is suitably connected, is screwed into the shank 12 and occupies a central socket 15 formed therefor in the handle 10. A spindle 17, for receiving the electrode wheel, is mounted in the clevis 13, and thus receives current direct from the conductor 16.

The electrode wheel comprises a hub 18 rotatably mounted upon the spindle 17 and formed at its end with a reduced portion 19. An electrode disc 20 is mounted upon the reduced portion 19 and secured thereon by means of a collar 21 which is mounted upon such reduced portion beyond the disc and is fastened to the hub 18 by means of rivets 22 which pass through the electrode disc 20. A pair of insulating discs 23 are secured, by means of rivets 24, to the electrode disc 20, one on each side of the latter. Washers 25 are placed upon the spindle 17 between the electrode wheel and the arms of the clevis 13.

The electrode disc 20 is formed with a series of contact teeth 26, and the insulating discs 23 are formed with teeth 27 of the same configuration. In assembling the insulating discs with the electrode disc, the former are so placed that their teeth 27 are opposite one another, but are disposed between the teeth 26 of the electrode disc. The edges of the insulating discs 23 are beveled so as to leave the sheet engaging faces of the teeth 27 of relatively small width.

In the use of the device, for example, in the welding together of aluminum foil, one lead of an electric circuit,—such for instance as a 110 volt A. C. lighting circuit, stepped down to about 10 volts by a transformer,—is connected with the foil. Where the foil is in process of being manufactured, this may be effected, of course, by grounding the lead to the machine in which the foil is being worked upon. The other lead of the circuit is connected to the conductor 16 of the device. With one sheet of foil super-imposed upon another,—or, if it is a question of uniting the torn ends of a web of foil, with one of said ends lapped upon the other,—the device is handled so that the electrode wheel rolls over the superimposed sheets. During such rolling action, each of the contact teeth 26 of the electrode disc comes into contact with the top sheet of the superimposed sheets, immediately breaking such contact and being replaced by a pair of teeth 27 of the insulating disc. As each of the teeth 26 of the electrode disc leaves the sheet of foil, it draws an arc between itself and such sheet, the next succeeding tooth 26 of the electrode disc being prevented from coming into contact with the foil by reason of the intervening insulating teeth 27. Thus a series of arcs are drawn between the foil and the teeth 26 of the electrode disc as the electrode wheel is rolled across the foil. These arcs are of sufficient heat intensity to melt not only the top sheet of foil but one or more sheets beneath it, resulting in a series of perforations with the metal of the sheets fused together around the edges of such perforations.

The appearance of two ends of a foil web after having been united by a line of welds produced as above described is illustrated in Fig. 4 in which $a$ represents the upper and $b$ the lower layer of the web, $c$ designating the row of perforations produced by rolling the electrode wheel over the lapped ends.

The construction of the electrode wheel with contact teeth and insulating teeth arranged in staggered relation with one another insures that an arc shall be produced on each occasion that one of the contact teeth leaves the sheet to be welded. In addition, the beveling of the edges of the insulating discs provides a relatively narrow line of rolling contact and insures that the contact teeth of the electrode disc shall duly engage and make contact with the sheet. The construction further insures that pressure imparted to the device will be correctly applied to the work on each side of the seam, so as to maintain the superimposed sheets in close contact at the points where the arcs are being drawn.

Although the construction of the electrode wheel heretofore described, in which the edges of the insulating discs 23 are formed with the teeth, is the preferred one, insulating discs having no teeth can be used. Such a construction is shown in Figure 5 of the drawing.

In the modified form of electrode wheel, the insulating discs 23a have continuous peripheries of a diameter equal to that of a circle formed by the tips of the teeth 26 of the electrode disc 20. During the rolling action of this modified form of wheel, contact is made between the teeth 26 and the top sheet of the superimposed sheets, and the breaking of such contact is brought about by that portion of the continuous peripheries of the insulating discs 23a between the teeth 26, thus preventing short-circuiting between the successive teeth, and the consequent prevention of the formation of the desired arcs.

I claim as my invention:

1. Apparatus for welding superimposed metallic sheets at transversely separated points through the formation of electric arcs at one of said sheets, said apparatus comprising an electrode adapted for relative movement with respect to the sheets and having a portion of contracted area adapted to make flatwise contact with one of the sheets, electric current supply means continuously connected to said electrode and said sheets, and means controlled by the relative movement between the electrode and the sheets for causing said portion to make contact with a sheet and then move away therefrom so as to establish and then extinguish an arc.

2. In an apparatus for welding superimposed metallic sheets at transversely separated points through the formation of electric arcs at one of said sheets, the combination with an electrode wheel having a plurality of relatively narrow peripheral sheet contacting teeth having their outer surfaces disposed substantially parallel with the axis of the wheel, and insulating means associated with said electrode wheel for preventing simultaneous contact with the sheet of successive teeth of said electrode wheel, of electric current supply means continuously connected to said electrode wheel and said sheets.

3. In an apparatus for welding superimposed metallic sheets at transversely separated points through the formation of electric arcs at one of said sheets, the combination with an electrode wheel having a plurality of relatively narrow peripheral sheet-contacting teeth having their outer surfaces disposed substantially parallel with the axis of the wheel, and sheet-contacting insulating means disposed between said teeth, of electric current supply means continuously connected to said electrode wheel and said sheets.

4. In an apparatus for welding superimposed metallic sheets at transversely separated points through the formation of electric arcs at one of said sheets, the combination with an electrode disc having a plurality of spaced peripheral sheet-engaging teeth, and an insulating disc associated with said electrode disc and having spaced peripheral sheet-engaging teeth disposed in the spaces between the teeth of said electrode disc, of electric current supply means continuously connected to said electrode disc and said sheets.

5. In an apparatus for welding superimposed metallic sheets at transversely separated points through the formation of electric arcs at one of said sheets, the combination with an electrode disc having a plurality of spaced peripheral sheet-engaging teeth, and a pair of insulating discs disposed one on each side of said electrode disc to embrace the latter, said insulating discs having spaced peripheral sheet-engaging teeth disposed in the spaces between the teeth of said electrode disc, of electric current supply means continuously connected to said electrode disc and said sheets.

CHARLES G. LLOYD.